United States Patent [19]

Huggins

[11] Patent Number: 4,999,489

[45] Date of Patent: Mar. 12, 1991

[54] OPTICAL SENSOR USING CONCAVE DIFFRACTION GRATING

[75] Inventor: Raymond W. Huggins, Mercer Island, Wash.

[73] Assignee: The Boeing Company, Seattle, Wash.

[21] Appl. No.: 325,249

[22] Filed: Mar. 17, 1989

[51] Int. Cl.$^5$ .............................................. G01J 3/50
[52] U.S. Cl. .............................. 250/226; 250/227.23; 250/237 G
[58] Field of Search ................. 250/226, 227, 231 SE, 250/237 G, 227.23; 350/356; 356/323, 326, 328, 334, 325

[56] References Cited

U.S. PATENT DOCUMENTS

| | | | |
|---|---|---|---|
| 3,151,247 | 9/1964 | Auvermann | 356/320 X |
| 3,222,978 | 12/1965 | Dreyfus | 356/320 X |
| 3,532,429 | 10/1970 | Hughes et al. | 356/320 |
| 3,822,098 | 7/1974 | Rudder et al. | 356/209 |
| 3,973,850 | 8/1976 | Pouey | 356/100 |
| 4,030,828 | 6/1977 | Sonobe et al. | 356/96 |
| 4,111,524 | 9/1978 | Tomlinson, III | 350/96.19 |
| 4,198,117 | 4/1980 | Kobayashi | 350/96.19 |
| 4,223,216 | 9/1980 | Quick et al. | 250/226 |
| 4,334,152 | 6/1982 | Dakin et al. | 250/226 |
| 4,546,466 | 10/1985 | Lopiccolo | 455/612 |
| 4,643,519 | 2/1987 | Bussard et al. | 350/96.19 |
| 4,652,080 | 3/1987 | Carter et al. | 350/96.19 |
| 4,740,688 | 4/1986 | Edwards | 250/226 |
| 4,816,672 | 3/1989 | Hughes | 250/226 |

FOREIGN PATENT DOCUMENTS 59-85918 5/1984 Japan.

OTHER PUBLICATIONS

Noda, Namioka and Seya, "Design of Holographic Concave Gratings for Seya-Namioka Monochromators", *Journal of the Optical Society of America*, vol. 64, No. 8, p. 1043, (Aug. 1974).
Yen, Friedrich, Morrison and Tangonan, "Planar Rowland spectrometer for fiber-optic wavelength demultiplexing", *Optics Letters*, vol. 6, No. 12, p. 639, (Dec. 1981).
Lerner, J., "Direct reading spectrometer optimization using two complementary concave holographic gratings", SPIE vol. 503 Application, Theory and Fabrication of Periodic Structures, p. 53, (1984).
Rowland, H. A., "On Concave Gratings for Optical Purposes", *Phil. Magazine*, vol. XVI, Series 5, p. 197, (Sep. 1883).
Pavlycheva, N. K., "Design of flat-field spectrograph employing a holographic grating", *The Optical Society of America*, p. 394, (1980).
Note, "Design of New Holographic Gratings for a High S/N Ratio Flat Field Spectrograph", *Optical System Design, Analysis and Production for Advanced Technology Systems*, reprint from the Proceedings, vol. 655, Innsbruck, Austria, p. 409, (Apr. 1986).
Paper, "Concave Diffraction Gratings Design Guide", *American Holograpic*, 9 pages (No date of issue).
Lewis, N., "Fiber optic sensors offer advantages for aircraft", *SPIE Optical Engineering Reports*, 2 pages (Jun. 1987).
Noda, Namioka, Seya, "Geometric Theory of the Grating", *Journal of the Optical Society of America*, vol. 64, No. 8, p. 1031, (Aug. 1974).

*Primary Examiner*—David C. Nelms
*Assistant Examiner*—Stephone B. Allen
*Attorney, Agent, or Firm*—Christensen, O'Connor, Johnson & Kindness

[57] ABSTRACT

An optical WDM sensor and sensing system for determining a value of a measurand, such as an encoder position. An optical source produces a composite input signal that includes a plurality of different wavelength component signals. The sensor includes an encoder and a concave diffraction grating. The encoder has a plurality of tracks, each track being responsive to the value of the measurand for modulating the intensity of light incident thereon to produce a modulated signal. The grating demultiplexes the composite input signal to produce separate component signals that are directed to an incident upon the respective tracks. Each track produces a modulated signal, and the modulated signals are multiplexed, preferably by the grating, to produce a return signal that may be demultplexed and detected to determine the measurand value. Preferably, the sensor comprises a planar optical waveguide having the grating formed on one side surface. The encoder may be positioned adjacent to the waveguide, or coupled to the waveguide via optical fibers.

14 Claims, 4 Drawing Sheets

_Fig. 5._

_Fig. 6._

_Fig. 7A._

_Fig. 7B._

OPTICAL SENSOR USING CONCAVE DIFFRACTION GRATING

FIELD OF THE INVENTION

The present invention relates to optical sensors and, in particular, to an optical sensor that uses wavelength division multiplexing techniques to sense the position of a movable object.

BACKGROUND OF THE INVENTION

Digital encoders or resolvers generate a digital output signal that indicates the position of an object, such as the linear position of a slide or the angular rotation of a shaft. The digital output signal is usually generated by a series of tracks, one track for each bit of the signal. The bit pattern on the tracks can be encoded by conducting/nonconducting elements. For example, a 1 state may be represented by a conducting element, and a 0 state by a nonconducting element. The digital code may then be read by an array of electrical wipers with the conducting elements having a common electrical return.

More recently, optical tracks have been used for encoders, wherein a 1 state is represented for example by a transparent element of the track, and a 0 state by an opaque element of the track. Alternately, reflecting and nonreflecting elements can be used to represent the data. The tracks may be illuminated by individual light sources, e.g., LEDs or incandescent bulbs, or by a common light source. Optical transmission or reflection may be read by a common detector, or by an array having one detector for each track. The detector outputs are converted into a 1 or 0 digital level by suitable electronics.

Most prior optical encoder systems have been interrogated or read via an electrical interface. Electrical interconnections are vulnerable to EMI and EMP, and, in some instances, electrical power may not be available at the location of the encoder. Therefore, for many applications, an electrically passive encoder, i.e., an encoder that requires neither electrical interconnects for interrogation, nor electrical power for operation, would be desirable. One method of obtaining the goal of an all optical encoder is to use optical fibers to interface the sensor with the optical sources and detectors. A number of such optical encoding systems have been proposed, including systems based upon optical time domain reflectometry, and systems based upon wavelength division mulitplexing (WDM).

In prior WDM systems of this type, a plane diffraction grating has been used as the dispersion element to demultiplex the incoming light into separate components based on wavelength, and to multiplex the light reflected or transmitted by the encoder tracks.

A fundamental problem common to such prior techniques is that optical elements are required between the optical fibers and the diffraction grating, and between the diffraction grating and the encoder tracks. In a system where the encoder tracks alternately transmit and block the light, four such optical elements are required. The first element collimates the light emerging from the first optical fiber before the light is incident on the diffraction grating. The second element focuses the component wavelengths of the diffracted light onto the associated encoder tracks. The third element collimates the light at the component wavelengths which are transmitted by the encoder tracks prior to the light being multiplexed by the diffraction grating. The fourth element focuses the collimated multiplexed beam after diffraction by the diffraction grating onto the second optical fiber. In a system where the encoder tracks either reflect or absorb light at the component wavelengths, light at the component wavelengths retraces the same path after reflection, and the number of optical elements is reduced to two. In both the transmission and reflection optical systems, the necessity for collimating and focusing optical elements increases both the optical complexity and size of the read head.

The reflection optical system is desirable as the number of optical components is half the number required in the transmission optical system. In such prior WDM systems, a single optical fiber has served as both the first and second optical fibers. An undesirable feature of such an arrangement is that at some point in the sensor system, light from the radiation source has to be coupled into the common optical fiber, and the reflected light from the sensor has to be coupled out of the common optical fiber to the demultiplexer/detector. This invariably results in an optical power system loss of at least −6 dB.

SUMMARY OF THE INVENTION

The present invention provides a sensor and a sensing system that utilize WDM techniques, and that overcome many of the limitations of prior WDM systems.

A sensor according to the present invention is used in an optical sensing system for determining a value of a measurand, such as the position of an encoder. The sensing system includes means for producing an optical composite input signal that includes a plurality of component signals. Each component signal comprises light in a wavelength range different from the wavelength ranges of the other component signals. The sensor comprises encoding means and a concave diffraction grating. The encoding means has a plurality of tracks, and each track includes means responsive to the value of the measurand for modulating the intensity of light incident thereon, to produce a corresponding modulated signal. The concave diffraction grating demultiplexes the composite input signal to produce separate component signals that are directed to, and incident upon, the respective tracks. Each track produces a modulated signal, and the modulated signals are multiplexed, preferably by the grating, to produce a return signal. The component and modulated signals may follow identical optical paths between the grating and encoding means, or the optical paths may be displaced from one another.

In a preferred embodiment, the sensor comprises a planar optical waveguide having an edge surface that includes a grating surface, a sensing surface, and input and output positions. The grating surface has the concave diffraction grating formed thereon, the grating having a radius of curvature equal to R. The sensing surface and the input and output positions are positioned at optical path lengths within the waveguide of approximately R from the grating surface. When the composite input signal is introduced into the waveguide at the input position, the signal is demultiplexed by the diffraction grating such that the component signals are substantially focused at a corresponding plurality of first points on the sensing surface. The position of each first point is a function of the wavelength of the associated component signal. Means are provided for coupling the component signals from the first points to the respective tracks, and for coupling the modulated signals into the waveguide at respective second points on the sensing surface, such that the modulated signals are multiplexed by the diffraction grating to produce the return signal at the output position. Such means for coupling may comprise optical fibers, or facets or the like formed on the sensing surface. By forming the grating holographically, planar sensing surfaces and encoders may be used.

DETAILED DESCRIPTION OF A PREFERRED EMBODIMENT

Figure 1:
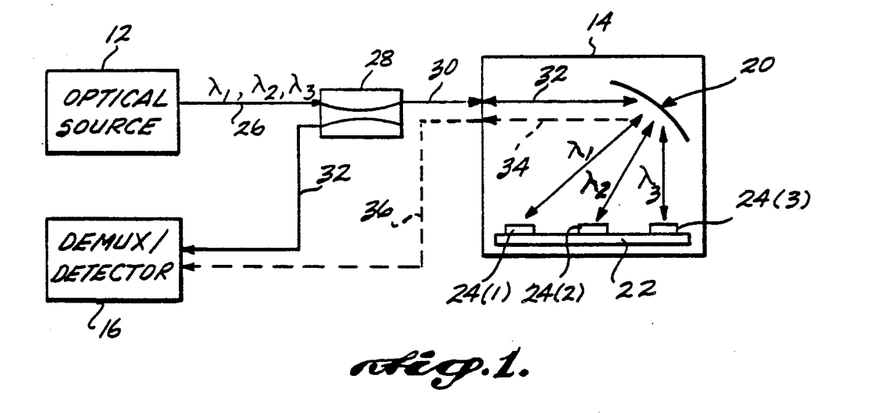
FIG. 1 is a schematic diagram illustrating operation of the sensor and sensing system of the present invention.

FIG. 1 schematically illustrates the operation of the sensor and sensing system of the present invention. The sensing system includes optical source 12, sensor 14, and demultiplexer (DEMUX)/detector 16. Sensor 14 comprises concave diffraction grating 20 and encoder 22 that includes tracks 24(1)–24(3). Only three tracks are shown, to simplify the drawing, although a larger number may of course be used. Encoder 22 is connected to a movable member whose position is to be sensed, such that when the movable member moves, encoder 22 moves in a direction normal to the drawing in FIG. 1. The movable member may be a shaft for a rotary encoder, or a slider or a linear encoder. Tracks 24 are shown in cross section, and in general each track includes a linear array of modulation elements, each modulation element being either reflecting or non-reflecting.

Optical source 12 produces an optical composite input signal on optical fiber 26, the composite input signal including three component signals, designated $\lambda_1$, $\lambda_2$ and $\lambda_3$. Each component signal comprises light in a wavelength range different from the wavelength ranges of the other component signals. Source 12 may either comprise a broadband source, or three discrete emitters such as three LEDs that have emission peaks at different wavelengths. The composite input signal is conveyed to sensor 14 via directional coupler 28 and optical fiber 30.

Within sensor 14, the composite input signal follows path 32 to concave diffraction grating 20, and the grating reflects and disperses the composite input signal, such that component signals $\lambda_1$–$\lambda_3$ are directed to tracks 24(1)–24(3) respectively. The "modulated signals reflected by the tracks then follow the reverse paths from the tracks to grating 20, and then multiplexed by the grating and reflected via path 32 to optical fiber 30. The modulated signals on optical fiber 30 are coupled to demultiplexer/detector 16 via directional coupler 28 and optical fiber 32. In an alternate arrangement, shown in phantom in FIG. 1, the modulated signals reflected by grating 20 follow path 34, and are coupled into a separate optical fiber 36 that transmits the modulated signals directly to the demultiplexer/detector.

Figure 2A:
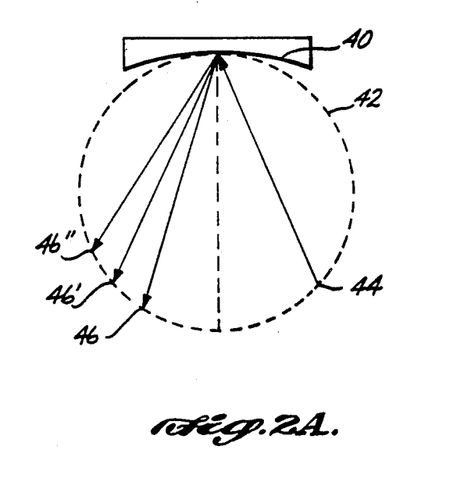
FIGS. 2A and 2B are schematic diagrams illustrating Rowland spectrometers.

In a preferred embodiment, the invention utilizes a spectrometer derived from the classical Rowland spectrometer to perform the demultiplexing and multiplexing functions in sensor 14. The operation of a classical Rowland spectrometer is schematically illustrated in FIG. 2A. The Rowland spectrometer makes use of a concave, reflective diffraction grating 40 as a dispersion element. The concave surface of grating 40 has a spherical shape, with a radius of curvature equal to R. The grating comprises linear grooves that are equally spaced along a chord of the concave grating surface. For such a concave grating, there is an associated Rowland circle 42 having a radius of R/2. The significance of the Rowland circle is that if a monochromatic point source 44 is positioned on the Rowland circle, then grating 40 will produce a focused image 46 of source 44 at another position on the Rowland circle. The position of image 46 is a function of the wavelength of the light. Thus, if source 44 comprises three different wavelength components, then three focused images 46, 46', and 46" will be produced on the Rowland circle. If source 44 is a broadband source, then a continuous spectrum will be imaged on the Rowland circle. Examples of prior art classical and conventional Rowland spectrometers are shown in U.S. Pat. Nos. 3,532,429, and 4,030,828.

Figure 2B:
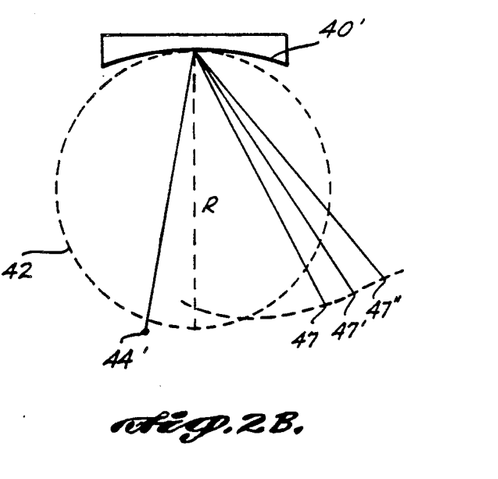

With the advent of high powered, coherent optical sources, it has become possible to produce diffraction gratings with complex line spacings using what is loosely referred to as holographic techniques. The relationship between the holographic exposure conditions and source position to the focal position for any wavelength to produce a modified Rowland spectrometer is described in U.S. Pat. No. 3,973,850, and in the paper by N. K. Pavlycheva, entitled "Design of Flat-Field Spectrograph Employing a Holographic Grating", 8 *Sov. J. Opt. Technol.* (*USA*) 46, 394–396 (1979). An example is shown in FIG. 2B. In FIG. 2B, diffraction grating 40' has been produced holographically, and the spacing of the lines is no longer linear across a chord as in the conventional Rowland spectrometer. Holographic illumination conditions can be found which modify the grating focusing property. For example, if the source 44' is located away from the Rowland circle 42, focused images 47, 47', and 47" will be produced at points removed from the Rowland circle. It is further possible to design the holographic illumination conditions so that a curve drawn through the three focal points approximates a straight line over a limited wavelength range. Gratings with similar complex line spacings can also be ruled by an interferometrically controlled ruling engine.

Figure 3:
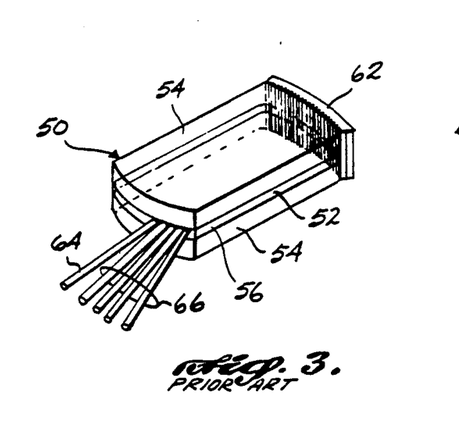
FIG. 3 is a perspective view of a slab Rowland spectrometer used as a demultiplexer.
Figure 4:
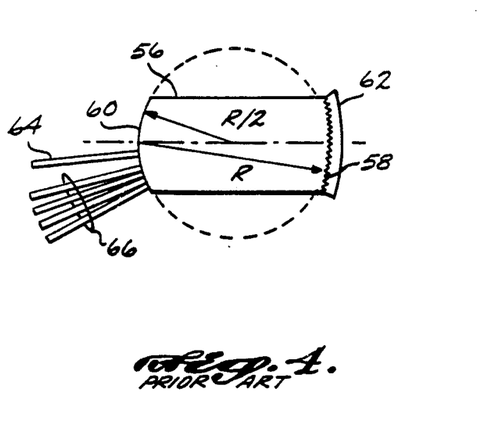
FIG. 4 is a cross-sectional view of the demultiplexer of FIG. 3.

In recent years, "slab" Rowland spectrometers have been developed as wavelength division multiplexers and demultiplexers for telecommunication applications, with both inputs and outputs being optical fibers. An example of a prior art demultiplexer based on a classical Rowland spectrometer is shown in FIGS. 3 and 4. The device comprises a body 50 formed by epoxying a thin cover glass 52 between two microscope slides 54, to thereby form a waveguide 56 in the cover glass layer. Body 50 has a cylindrical end face 58 having a radius of curvature R, and a cylindrical front face 60 having a radius of curvature of R/2. A flexible, reflective diffraction grating 62 is positioned against end faces 58 to form the concave Rowland diffraction grating. The distance between the front and end faces in equal to R, the radius of curvature of the grating.

Input optical fiber 64, containing a signal to be demultiplexed, is butted up against waveguide 56 at front face 60. The input signal on optical fiber 64 includes a plurality of different wavelength components. Light introduced into waveguide 56 from optical fiber 64 is reflected and diffracted by grating 62, at an angle that depends upon the wavelength of the light. Output optical fibers 66 are also butted up against waveguide 56 at front face 60, such that each output optical fiber receives light of a different wavelength.

The operation of the demultiplexer shown in FIGS. 3 and 4 is generally similar to that of a conventional Rowland spectrometer, except that the light path is two-dimensional and confined within the planar waveguide. Confinement of the light within the waveguide degrades the resolution to about 1% for an input optical fiber having numerical aperture of 0.2, due to multimode propagation within the waveguide. Since this intrinsic degradation is comparable to the resolution limit due to the optical fiber diameter, small devices (e.g. 1 cm. square), are practical where fiber diameter effects will dominate.

Figure 5:
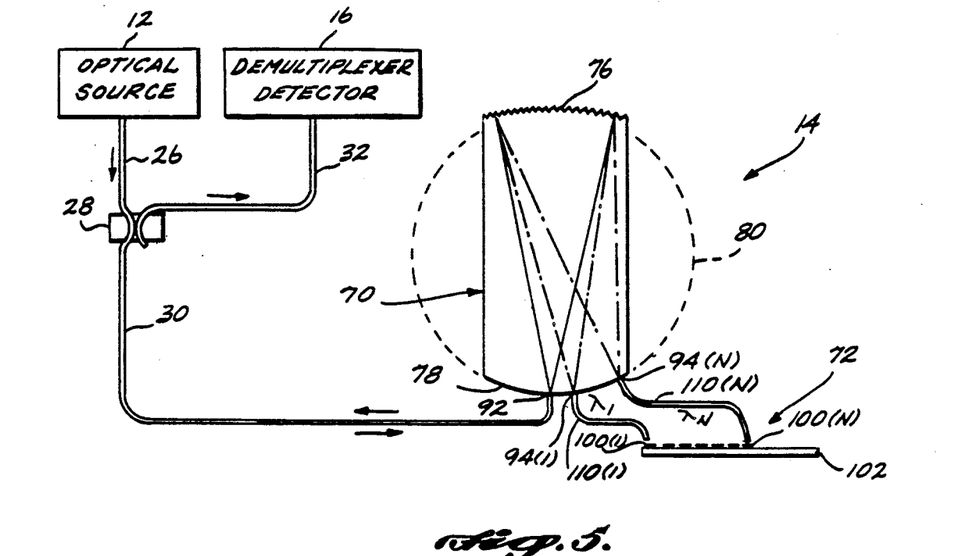
FIG. 5 is a schematic view of a first preferred embodiment of a sensor system according to the present invention.

A first preferred embodiment of the optical sensing system of the present invention is shown in FIG. 5, and is based on a conventional Rowland spectrometer. The system comprises optical source 12, demultiplexer/detector 16, directional coupler 28, and optical fibers 26, 30 and 32, as shown in FIG. 1. In the system of FIG. 5, sensor 14 comprises planar waveguide 70 and encoder 72. Waveguide 70, which may be formed in a manner similar to that shown for the demultiplexer shown in FIGS. 3 and 4, includes a concave grating surface having a reflective concave diffraction grating 76 formed thereon, and a sensing surface 78 having a radius of curvature of 5/2. Rowland circle 80 for grating 76 is tangent to the midpoint of the grating, and has a radius of R/2. Waveguide 70 is fabricated such that surface 78 is positioned on Rowland circle 80.

At sensor 14, optical fiber 30 is butted up against sensing surface 78 at input position 92. The composite input signal produced by source 12 travels through optical fibers 26 and 30, and enters waveguide 70 at input position 92. This light travels through the waveguide, and is diffracted and focused by grating 76 such that the light is imaged onto a plurality or continuous range of positions on surface 78. To simplify the discussion, it will be assumed that the composite input signal comprises N different wavelength component signals, rather than a continuous spectrum, although a source containing a continuous spectrum could be used. FIG. 5 shows the ray paths for the shortest ($\lambda_1$) and longest ($\lambda_N$) wavelength component signals, which component signals arrive at points 94(1) and 94(N) on surface 78 respectively.

Encoder 72 comprises N tracks 100(1) through 100(N) positioned on a movable member 102. Typically, movable member 102 is coupled to an object whose position is to be sensed. More generally, sensor 14 could be constructed such that member 102 moves in response to any arbitrary measurand. Tracks 100(1) through 100(N) are positioned generally adjacent to one another on member 102. The tracks are shown in cross section in FIG. 5, each track comprising an elongated section of the encoder that extends normal to the plane of the figure, and that comprises a sequence of reflecting and nonreflecting elements. The tracks would be circular for a rotary encoder, or linear for a linear encoder.

N optical fibers 110(1)–100(N) are used to coupled light from points 94 on surface 78 to the respective tracks 100 of encoder 72. Depending on the position of the encoder, each track may or may not reflect the component signal on optical fiber 110. This process can be generally described by stating that each track modulates its respective component signal to produce a modulated signal. In the illustrated embodiment, the modulated signal has a high intensity when the track has a high reflectivity, and a low intensity when the track has a low reflectivity. For each track, the modulated signal reenters optical fiber 110 and then retraces the component signal path back to point 94 and grating 76, and the grating combines the modulated signals to produce a return signal that is focused at position 92 and launched into optical fiber 30. Directional coupler 28 couples the return signal to demultiplexer/detector 16 via optical fiber 32. The demultiplexer/detector demultiplexers the return signal to produce the separate modulated signals corresponding to the different tracks, and determines the intensity of each modulated signal, to determine the present reflecting and nonreflecting condition of the encoder tracks, and thereby to determine the position of member 102.

Figures 6, 7A, 7B:
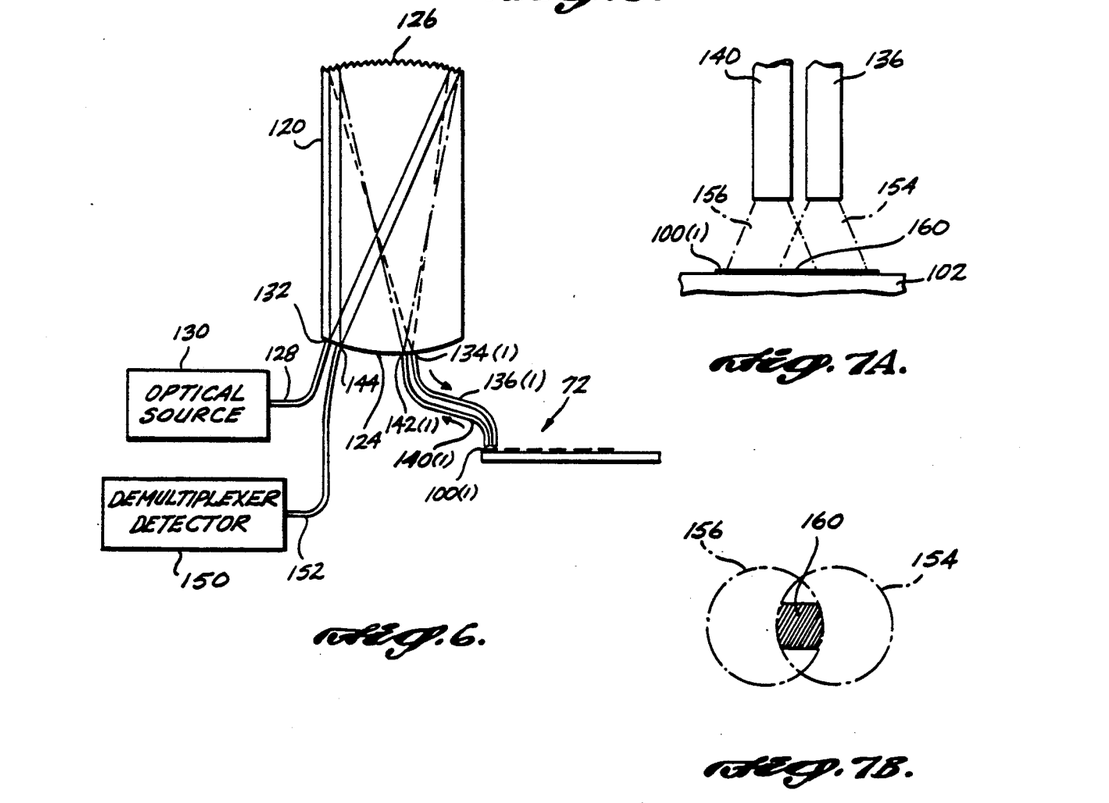
FIG. 6 is a schematic diagram of a second preferred embodiment of the invention.
FIGS. 7A and 7B illustrate the overlap between the illumination and accordance cones of adjacent optical fibers.

A second preferred embodiment of the invention is illustrated in FIG. 6. This embodiment includes waveguide 120 having concave diffraction grating 126 of radius of curvature R, and surface 124 of radius of curvature R/2. Light from source 130 is coupled by optical fiber 128 to input position 132 on surface 124, and is reflected and diffracted by the grating such that the light is imaged onto a plurality or continuous range of positions 134 on surface 124. For simplicity, only a single position 134(1) and its associated ray path is shown in FIG. 6.

Optical fiber 136(1) couples the light receiving point 134(1) to track 100(1) of encoder 72. The reflected modulated signal is reflected back into optical fiber 140(1) and coupled by optical fiber 140(1) to position 142(1) on sensing surface 125. The modulated signal then passes through the waveguide, is combined and reflected by grating 126 to point 144 that is positioned closely adjacent to position 132 on surface 124. This return signal is then coupled to the demultiplexer/detector 150 by optical fiber 152. Details of the interface between optical fibers 136 and 140 and the encoder are shown in FIGS. 7A and 7B. Optical fibers 136 and 140 are positioned adjacent to one another, such that illumination cone 154 and acceptance cone 156 overlap one another on the surface of the encoder track within overlap region 160. Optical fibers 136 and 140 should be positioned as close to one another as possible, to increase the size of the overlap region to thereby improve the efficiency of the system. The axes of the optical fibers may be inclined to the vertical in order to increase the overlap region.

Figure 8A:
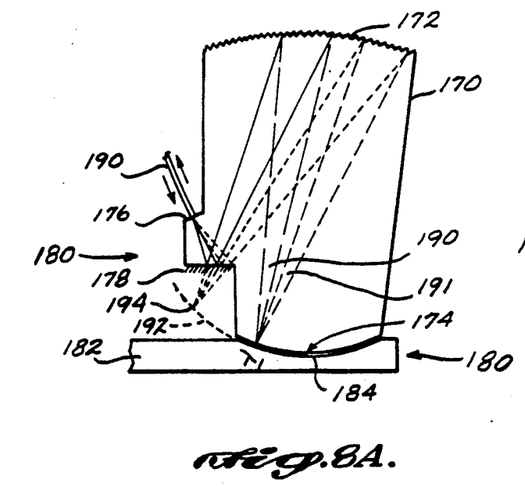
FIG. 8A and 8B illustrate a third preferred embodiment of the invention.
Figure 8B:
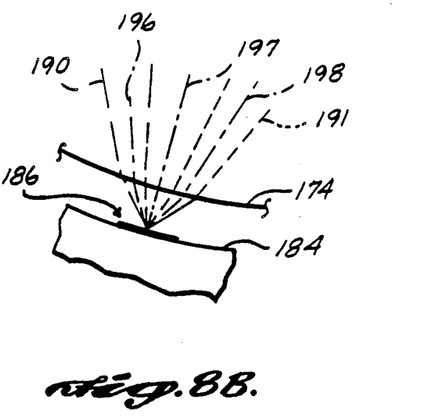

A third preferred embodiment of the invention is shown in FIGS. 8A and 8B. This embodiment includes waveguide 170 having grating 172 of radius of curvature R on one side surface, and having a surface 174 of radius of curvature slightly less than R/2 whose midpoint is positioned at a distance slightly less than R away from the midpoint of grating 172. Waveguide 170 further includes input/output surface 176 and mirror 178. For this embodiment, encoder 180 includes movable member 182 that includes a concave encoder surface 184 of radius of curvature approximately equal to R/2, positioned a short distance away from surface 174. Surface 184 coincides with the focal plane of grating 172. As with prior embodiments, encoder surface 184 includes encoder tracks, only one encoder track 186 being illustrated in FIG. 8B.

In operation, the composite input signal is coupled from optical fiber 190 into the waveguide at input/output surface 176. This light is reflected by mirror 178 onto grating 172. The grating disperses the light and brings it nearly to a focus on surface 174. The optical path length from input/output surface 176 to mirror 178 to grating 172 is the same as if input/output surface 176 had been located on the Rowland circle 192 at point 194. Because of mirror 178, the composite input striking grating 172 appears to be originating from a virtual source 194 positioned on the Rowland circle 192. The midpoint of surface 174 is spaced from the midpoint of grating 172 by a distance slightly less than R, and encoder 182 is positioned such that the tangential focus of each component signal is coincident with encoder surface 184. Thus, as is shown in FIG. 8B, each component signal of the composite input signal on optical fiber 190 is incompletely focused when it exits surface 174, but is refracted at surface 174 to produce a small focal spot on track 186.

In order to form grating 172 such that light originating from virtual source 192 is imaged just outside surface 174, the grating may be formed by a holographic process rather than by a traditional mechanically ruled process. Encoder surface 184 is contoured such that its cross section is a chord with a radius of curve equal to R/2, the radius of curvature of the Rowland circle. FIG. 8B shows illumination cone 190 for one component signal. With the described arrangement, except at the center of surface 184, the conical bisector 196 of the illumination cone of each component signal will not be normal to the surface 184. When the track 186 is reflecting, the conical bisector 198 of the reflected cone 191 will lie at an equal angular distance from the normal 197 as the conical bisector of the illumination convex 196. As shown in FIG. 8A, the reflected cone will be incident on the grating at a point to the right of the illumination cone. However, the focusing properties of the grating are such that light in the reflected cone will be refocused on the virtual point 194, and hence on the end of optical fiber 190. For simplicity, light at only one wavelength $\lambda_1$ is shown. However, reflected light at other wavelengths of other component signals will likewise be refocused on optical fiber 190. Increasing the angle of the illumination cone would result in some light hitting the sides of the waveguide. If the sides are reflecting, rays hitting the sides will increase the background light. If however, the sides are absorbing, the angle of the illumination cone could be increased with the benefit of increased light throughput.

Figure 9A:
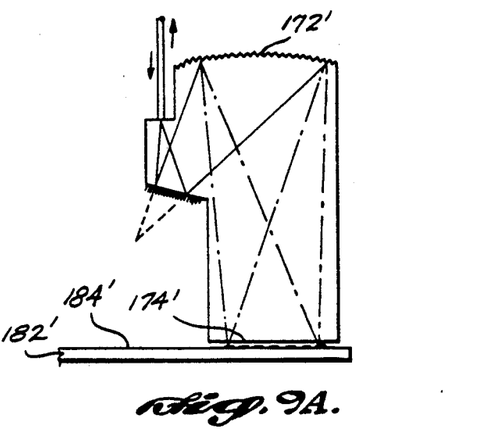
FIGS. 9A and 9B illustrate a fourth preferred embodiment of the invention.
Figure 9B:
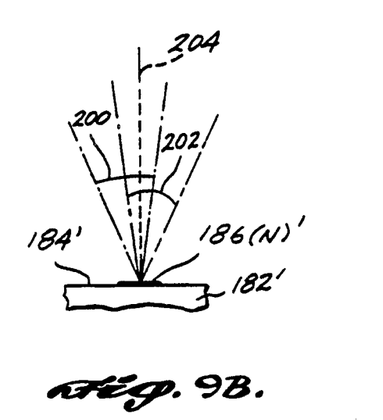

A fourth embodiment of the invention is shown in FIGS. 9A and 9B. This embodiment is similar to the embodiment shown in FIGS. 8A and 8B, except that surface 174' and encoder surface 184' are now flat rather than cylindrical. The focal field of convex grating 172' is coincident with encoder surface 184'. A concave grating that produces a flat focal field can be produced by holographic processes. Referring to FIG. 9B, reference numeral 200 indicates the illumination one of the incoming component signal for track 186(N)', while reference numeral 202 represents the cone of the modulated signal reflected by the track. Line 204 represents the normal to encoder surface 184'. Thus in this embodiment, for the tracks at either end of the encoder, a certain amount of the modulated signal is lost, since all the light is not reflected back into the illumination cone. The angle of the illumination cone could be reduced, with some loss of light throughput, to reduce scattered light.

Figure 10A:
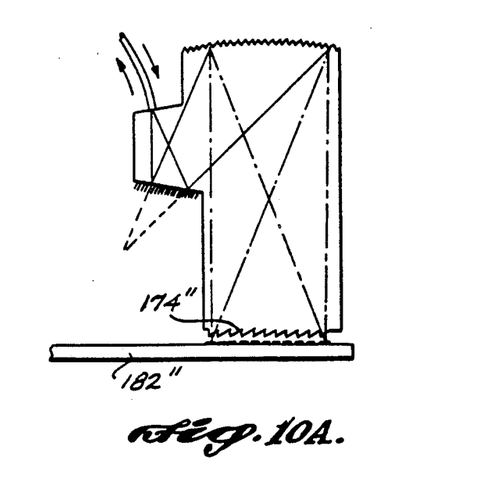
FIGS. 10A and 10B illustrate a fifth preferred embodiment of the invention.
Figure 10B:
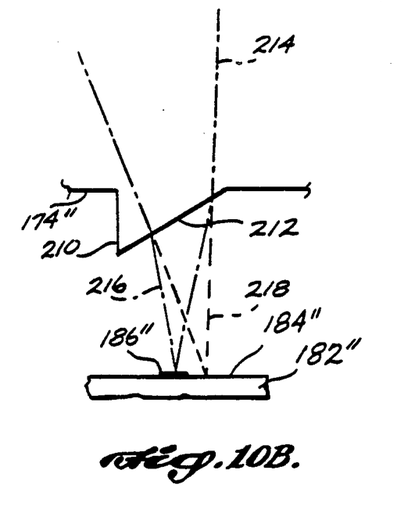

A further embodiment is shown in FIGS. 10A and 10B. This embodiment is similar to that of FIGS. 9A and 9B, except that the surface 174" is now formed as a series of facets 210, as shown in FIG. 10B. Each facet is associated with a single track 186" on movable member 182". As a result of the angled face 212 of facet 210, the component signal in illumination cone 214 is refracted along path 216, rather than along path 218, such that the conical bisector of the component signal strikes the encoder normal to encoder surface 184". As a result, essentially all of the modulated signal reflected by track 186" is recovered for use by the detector. This arrangement allows the maximum cone angle to be used without loss of light caused by the rays hitting the sides of the spectrograph.

Figure 11A:
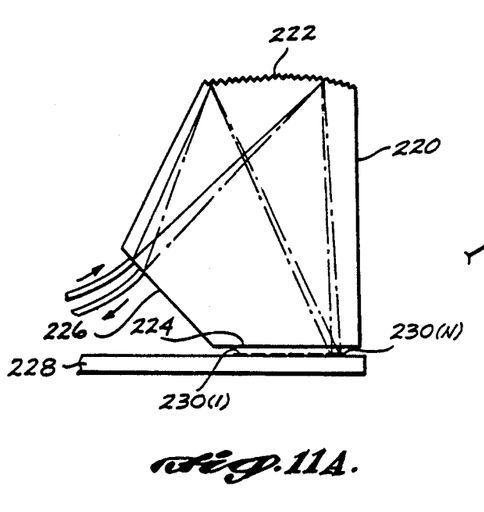
FIGS. 11A and 11B illustrate a sixth preferred embodiment of the invention.
Figure 11B:
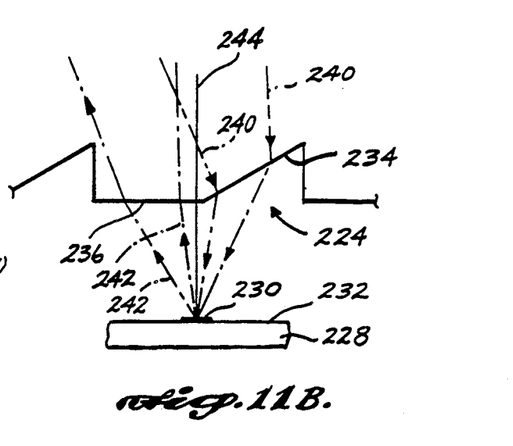

A further embodiment of the invention is illustrated in FIGS. 11A and 11B. In FIG. 11A, waveguide 220 includes concave diffraction grating 222, flat surface 224 and input/output surface 226. Encoder 228 includes a plurality of tracks 230(1) through 230(N), the encoder having an encoder surface 232 positioned adjacent to surface 224. Surface 224 and encoder surface are both generally planar.

Surface 224 is shown in greater detail in FIG. 11B. For each track 230, surface 224 includes an input facet 234 and output facet 236. The incoming component signal, represented by incident cone 240, passes through input facet 234, and is refracted and focused onto track 230. The modulated signal represented by reflected cone 242 then reenters the waveguide via facet 236. Line 244 represents the normal to encoder surface 232. The angle which the conical bisector of the incident cone 240 makes with facet 234 is such that the conical bisector of the incident cone is refracted past the normal to the track. The modulated signal is refracted at facet 236 such that inside the waveguide, reflected cone 242 is displaced by a small distance from the incident cone. The modulated signal reflected by grating 222 is therefore incident onto input/outupt surface 226 at an output position spaced from but adjacent to the input position, and is coupled into a separate optical fiber for routing to the demultiplexer/detector.

Figures 12A, 12B:
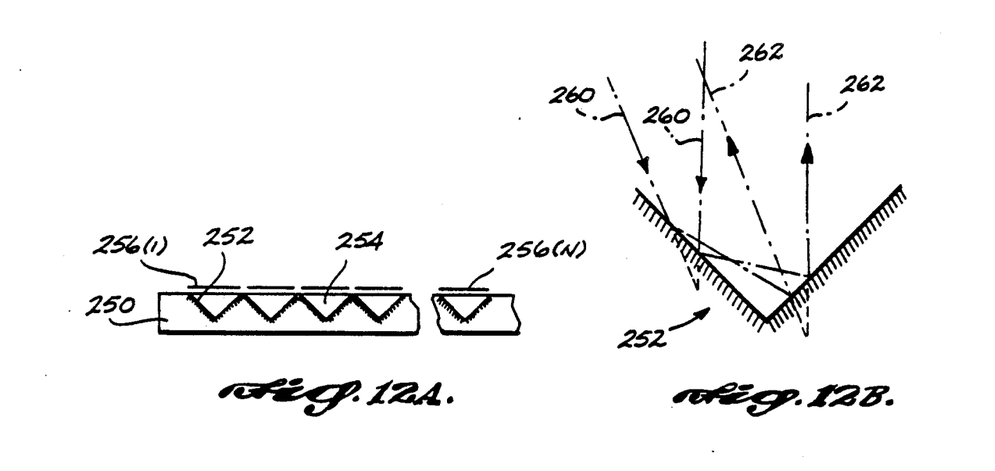
FIGS. 12A and 12B illustrate formation of the encoder surface using retroreflectors.

An alternate technique for displacing the modulated signals from the incoming component signals, so that the diffracted and reflected modulated signals are displaced from the input position, is to use a non-isotropic retroreflecting encoder slide or disk. For a retroreflecting surface, the reflected rays are displaced from the incident rays by a small distance, but are reflected to a direction that is parallel to, but opposite to, the incident rays, and that is independent of the angle of incidence. Non-isotropic implies that the rays are displaced in a single direction. If the rays can be displaced by a distance somewhat greater than the fiber diameter, a transmission read head can be built without having to cut facets, as in the embodiments of FIGS. 10 and 11. A method of fabricating a retroreflecting encoder track is shown in FIGS. 12A and 12B. Encoder 250 includes retroreflectors 252 formed in its upper surface, the retroreflector cavities being filled by transparent filler material 254. Tracks 256 are then formed on the filler material directly over each retroreflector. Transparent filler 254 may comprise epoxy, and tracks 256 may be formed by conventional techniques such as photolithography. For mass production purposes, the grooved surface of encoder 250 could be formed by casting or injection molding.

FIG. 12B shows the ray path for the incoming component signal 260 and the corresponding reflected modulated signal 262, and illustrates that the desired lateral displacement is obtained. Unlike the encoder shown in prior embodiments, the digital pattern of tracks 256 must be the negative of the desired digital code, and have absorbing or non-reflecting characteristics.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. A sensor for use in an optical sensing system for determining a value of a measurand, the sensing system including means for producing an optical composite input signal that includes a plurality of component signals, each component signal comprising light in a wavelength range different from the wavelength ranges of the other component signals, the sensor comprising:
   encoding means having a plurality of tracks, each track including means responsive to the value of the measured for modulating the intensity of light incident thereon to produce a corresponding modulated signal; and
   a concave diffraction grating for demultiplexing the composite input signal to produce separate component signals that are directed to and incident upon the respective tracks such that the tracks produce respective modulated signals, and means for multiplexing the modulated signals to produce a return signal.

2. The sensor of claim 1, wherein the modulated signals are directed back to the grating, and wherein the grating comprises the means for multiplexing the modulated signals to produce the return signal.

3. The sensor of claim 2, wherein the component signals and the respective modulated signals follow identical optical paths, in reverse, between the grating and the encoding means.

4. The sensor of claim 2, wherein the component signals and the respective modulated signals follow paths that are displaced from one another, such that the return signal is displaced from the composite input signal.

5. The sensor of claim 2, wherein sensor comprises:
   a planar optical waveguide having an edge surface that includes a grating surface, a sensing surface, an input position, and an output position, the grating surface having the concave diffraction grating with a radius of curvature R formed thereon, the sensing surface and the input and output positions each having positioned at an optical path length within the waveguide of approximately R from the grating surface such that the composite input signal introduced into the waveguide at the input position is demultiplexed by the diffraction grating such that the component signals are substantially focused at a corresponding plurality of first points on the sensing surface, the position of each first point being a function of the wavelength of the associated component signal; and
   means for coupling the component signals from said plurality of first points on the sensing surface to the respective track, and for coupling the modulated signals produced by the tracks into the waveguide at a respective plurality of second points on the sensing surface such that the modulated signals are multiplexed by the diffraction grating to produce the return signal at the output position.

6. The sensor of claim 5, wherein the means for coupling light from said plurality of first points of the respective tracks comprises a optical fiber for each track.

7. The sensor of claim 6, wherein for each track the optical fiber also couples the modulated signal to the respective second point, wherein the respective first and second points are identical to one another, and wherein the input and output positions are identical to one another.

8. The sensor of claim 6, further comprising a plurality of second optical fibers, each second optical fiber coupling one of the modulated signals to the associated second point, where each second point is positioned adjacent to the corresponding first point on the sensing surface, and wherein the output position is adjacent to the input position.

9. The sensor of claim 5, wherein the sensing surface has a cylindrical shape and is located on a Rowland circle of diameter R that is tangent to the diffraction grating.

10. The sensor of claim 5, wherein said sensing surface is planar.

11. The sensor of claim 5, wherein the sensing surface includes a plurality of angled facets, one facet associated with and positioned adjacent to each track, the facets being positioned in a plane, each facet including a surface positioned at an angle with respect to said plane, the angle being selected such that the respective component signal exiting from the waveguide through the facet travels in a direction normal to said plane.

12. The sensor of claim 5, wherein the means for coupling comprises displacement means for causing each modulated signal to be displaced with respect to the corresponding component signal such that each second point is positioned adjacent to the corresponding first point, and such that the output position is adjacent to the input position.

13. The sensor of claim 12, wherein for each track, the displacement means comprises an angled facet formed in the sensing surface adjacent to the track, the facets being positioned in a plane, each facet including a surface positioned at an angle with respect to said sensing surface.

14. The sensor of claim 12, wherein for each track, the displacement means comprising retroreflecting means associated with each track.

* * * * *

UNITED STATES PATENT AND TRADEMARK OFFICE
CERTIFICATE OF CORRECTION

PATENT NO.  : 4,999,489

DATED  : March 12, 1991

INVENTOR(S) : Raymond W. Huggins

It is certified that error appears in the above-identified patent and that said Letters Patent is hereby corrected as shown below:

| Column | Line | Error |
|---|---|---|
| 57, Abstract | 16 | Delete "demultplexed" and insert therefor --demultiplexed-- |
| 1 | 21 | Delete "wipers" and insert therefor --wipers,-- |
| 1 | 50 | Delete "mulitplexing" and insert therefor --multiplexing-- |
| 3 | 27 | Delete "accordance" and insert therefor --acceptance-- |
| 5 | 13 | Delete "faces 58" and insert therefor --face 58-- |
| 5 | 51 | Delete "5/2" and insert therefor --R/2-- |
| 6 | 51 | Delete "receiving" and insert therefor --reaching-- |
| 6 | 55 | Delete "surface 125" and insert therefor --surface 124-- |
| 7 | 53 | Delete "convex 196" and insert therefor --cone 196-- |
| 8 | 9 | Delete "one" and insert therefor --cone-- |
| 8 | 58 | Delete "outupt" and insert therefor --output-- |
| 8 | 68 | Delete "reflected to" and insert therefor --reflected in-- |
| 9 | 42 | Delete "measured" and insert therefor --measurand-- |
| 10 | 4 | Delete "having" and insert therefor --being-- |
| 10 | 23 | Delete "points of" and insert therefor --points to-- |

UNITED STATES PATENT AND TRADEMARK OFFICE
CERTIFICATE OF CORRECTION

PATENT NO. : 4,999,489

DATED : March 12, 1991

INVENTOR(S) : Raymond W. Huggins

It is certified that error appears in the above-identified patent and that said Letters Patent is hereby corrected as shown below:

| Column | Line | |
|---|---|---|
| 10 | 66 | Delete "comprising" and insert therefor --comprises--. |

Signed and Sealed this

Fifth Day of January, 1993

Attest:

DOUGLAS B. COMER

Attesting Officer — Acting Commissioner of Patents and Trademarks